(12) United States Patent
Pettersson et al.

(10) Patent No.: US 10,933,342 B2
(45) Date of Patent: Mar. 2, 2021

(54) HEAT TRANSFER TUBE AND METHOD FOR MANUFACTURING A HEAT TRANSFER TUBE

(71) Applicant: VALMET AB, Sundsvall (SE)

(72) Inventors: Krister Pettersson, Stenungsund (SE); Martin Apel, Mölndal (SE)

(73) Assignee: VALMET AB, Sundsvall (SE)

( * ) Notice: Subject to any disclaimer, the term of this patent is extended or adjusted under 35 U.S.C. 154(b) by 0 days.

(21) Appl. No.: 16/481,551

(22) PCT Filed: Feb. 2, 2018

(86) PCT No.: PCT/SE2018/050090
§ 371 (c)(1),
(2) Date: Jul. 29, 2019

(87) PCT Pub. No.: WO2018/143886
PCT Pub. Date: Aug. 9, 2018

(65) Prior Publication Data
US 2020/0056331 A1    Feb. 20, 2020

(30) Foreign Application Priority Data
Feb. 3, 2017  (SE) .................................. 1750094-3

(51) Int. Cl.
*B01D 1/06* (2006.01)
*B01D 1/30* (2006.01)
(Continued)

(52) U.S. Cl.
CPC .............. *B01D 1/065* (2013.01); *B01D 1/30* (2013.01); *B21D 22/02* (2013.01); *B21D 51/10* (2013.01);
(Continued)

(58) Field of Classification Search
CPC . B01D 1/06; B01D 1/065; B01D 1/30; B21D 22/02; B21D 51/10; B23K 11/0073;
(Continued)

(56) References Cited

U.S. PATENT DOCUMENTS

| | | |
|---|---|---|
| 3,826,304 A | 7/1974 | Withers et al. |
| 4,251,907 A | 2/1981 | Bleckmann et al. |

(Continued)

FOREIGN PATENT DOCUMENTS

| | | |
|---|---|---|
| CN | 201145509 Y | 11/2008 |
| DE | 36 43 794 C1 | 12/1987 |

(Continued)

OTHER PUBLICATIONS

USPTO Office Action, U.S. Appl. No. 16/481,553, dated Jun. 19, 2020, 11 pages.

(Continued)

*Primary Examiner* — Brian A McCaig
(74) *Attorney, Agent, or Firm* — Foley & Lardner LLP

(57) ABSTRACT

The invention relates to a heat transfer tube (9) for falling film evaporation having a heating medium surface (21) to be heated by a heating medium, a falling film surface (20) to have spent liquor passing over it, and being made from an sheet metal material. The falling film surface of the heat transfer tube is equipped with a multitude of wire bumps (WB), each wire bump being spaced apart along the longitudinal axis (CC) of the heat transfer tube from a neighbouring wire bump by 3-300 mm, said wire bumps (WB) having a height (h) in the range 0.3 to 5.0 mm, a width (w) in the range 0.3-5.0 mm, and an inclination angle (a) versus a plane orthogonal to a longitudinal axis (CC) of the heat transfer tube in a range of 0-70 degrees. The invention also relates to a method for manufacturing said heat transfer tube.

19 Claims, 6 Drawing Sheets

(51) Int. Cl.
- *F28F 1/34* (2006.01)
- *B21D 22/02* (2006.01)
- *B21D 51/10* (2006.01)
- *D21C 11/00* (2006.01)
- *D21C 11/10* (2006.01)
- *B23K 11/00* (2006.01)
- *B23K 11/16* (2006.01)
- *B23K 101/06* (2006.01)
- *B23K 103/04* (2006.01)
- *B23K 101/08* (2006.01)

(52) U.S. Cl.
CPC .......... *B23K 11/0073* (2013.01); *B23K 11/16* (2013.01); *D21C 11/0007* (2013.01); *D21C 11/10* (2013.01); *F28F 1/34* (2013.01); *B23K 2101/06* (2018.08); *B23K 2101/08* (2018.08); *B23K 2103/05* (2018.08); *F28F 2275/06* (2013.01)

(58) Field of Classification Search
CPC ..... B23K 11/16; D21C 11/0007; D21C 11/10; F28F 1/34; F28F 1/426; F28F 3/044; F28F 3/046; F28F 21/083; F28D 5/02; F28D 7/16
See application file for complete search history.

(56) References Cited

U.S. PATENT DOCUMENTS

| | | |
|---|---|---|
| 6,013,890 A | 1/2000 | Hulsizer |
| 6,056,048 A | 5/2000 | Takahashi et al. |
| 6,655,451 B2 | 12/2003 | Tada et al. |
| 2003/0089489 A1 | 5/2003 | Tada et al. |
| 2012/0214017 A1 | 8/2012 | Murphy et al. |
| 2015/0184845 A1 | 7/2015 | Lobscheid |

FOREIGN PATENT DOCUMENTS

| | | |
|---|---|---|
| JP | 58-084001 A | 5/1983 |
| WO | WO 96/01140 A1 | 1/1996 |
| WO | WO 96/32998 A1 | 10/1996 |

OTHER PUBLICATIONS

USPTO Office Action, U.S. Appl. No. 16/481,548, dated Aug. 27, 2020, 9 pages.
Extended European Search Report, Application No. 18747562.9, dated Mar. 16, 2020, 8 pages.
Extended European Search Report, Application No. 18748565.1, dated Mar. 16, 2020, 8 pages.
Extended European Search Report, Application No. 18748566.9, dated Mar. 19, 2020, 9 pages.
USPTO Notice of Allowance, U.S. Appl. No. 16/481,548, dated Nov. 25, 2020, 10 pages.
USPTO Notice of Allowance, U.S. Appl. No. 16/481,553, dated Nov. 25, 2020, 9 pages.

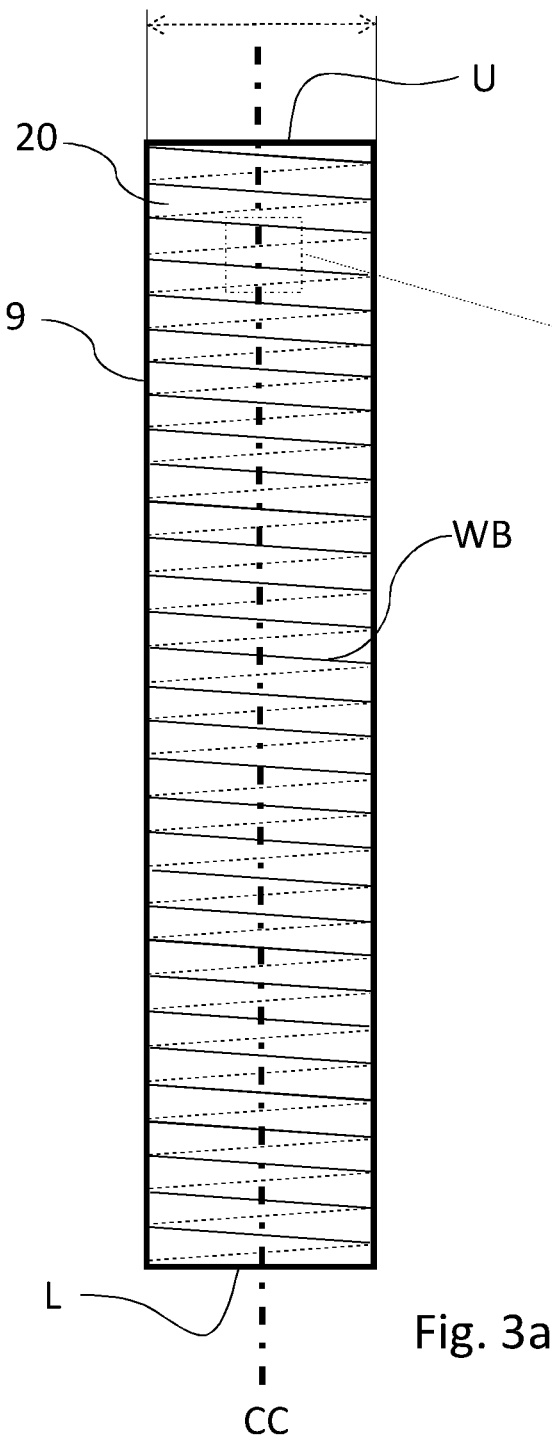
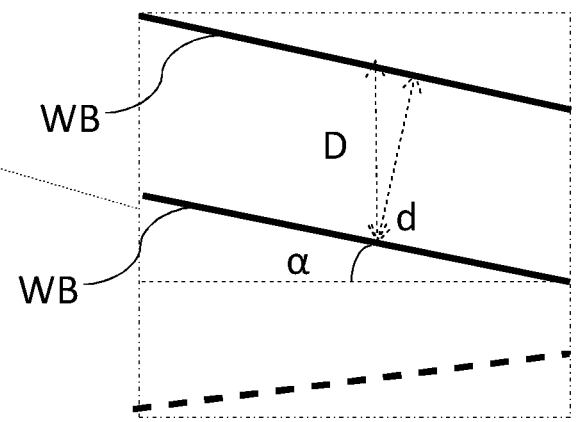
Fig. 3b
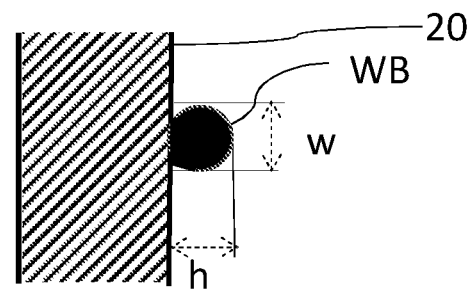
Fig. 3c
Fig. 3a

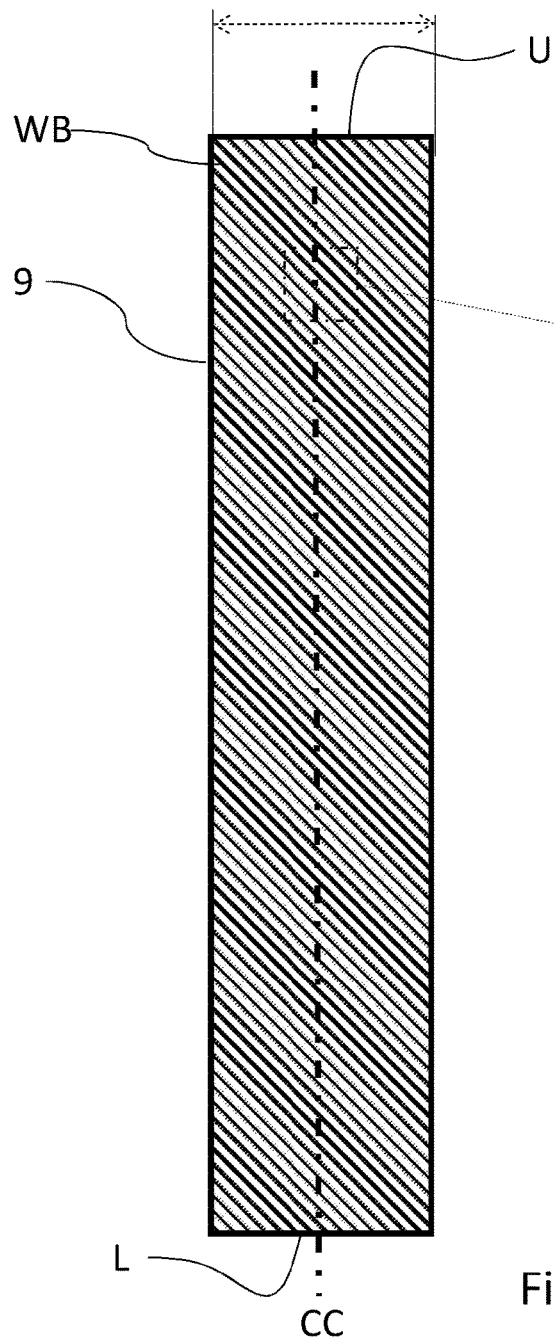
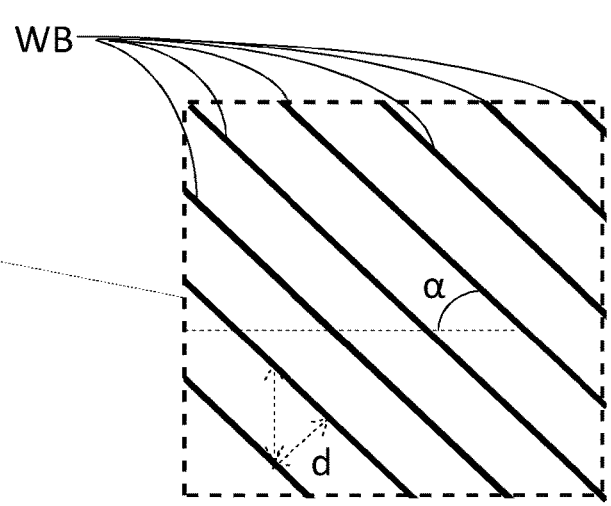
Fig. 4b
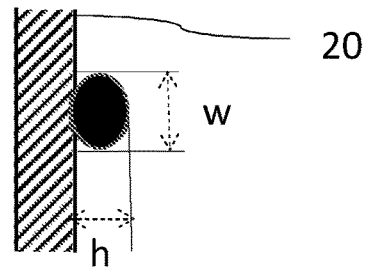
Fig. 4c
Fig. 4a

HEAT TRANSFER TUBE AND METHOD FOR MANUFACTURING A HEAT TRANSFER TUBE

TECHNICAL FIELD

The invention relates to a heat transfer tube for falling film evaporation of spent liquor. The heat transfer tube has a heating medium surface arranged to be heated by a heating medium, and a falling film surface opposite and facing away from said heating medium surface, which falling film surface is arranged to have spent liquor containing lignin and other dissolved components from cellulosic material and/or inorganics from the cellulosic material and chemicals used passing over it as a falling film while evaporating solvent (mainly water) from the falling film and thus increasing the dry matter content as well as viscosity. The heat transfer tube is made from a sheet metal material. A suitable material to be used is an iron based steel material, e.g. a high alloy stainless with an alloy content above 16.00% for Chromium and above 1% for Nickel, preferably corresponding to corrosion resistant steel qualities at least like AISI 316 or AISI 304. The invention also relates to a method for manufacturing a heat transfer tube for falling film evaporation of spent liquor as disclosed above.

BACKGROUND

In the general technology area of improving heat transfer a multitude of designs for heat transfer surfaces have been proposed. However, improving heat transfer surfaces in evaporation stages for spent liquor in pulp mills has proven to be difficult. These liquids of biological origin often contain a high concentration of dry matter in the form of fiber residues, lignin and salts causing fouling and scaling in said evaporation stages. The dry matter content may in a first evaporation stage lie at 20% or more, and in final evaporation stages even reach 80% or more, before the spent liquor is burned in the recovery boiler. Hence, to prevent such formation of fouling and scaling, heat transfer tubes are predominantly equipped with smooth surfaces on the spent liquor side. However, even with such smooth surfaces it is often seen that precipitations are collected in the lower parts of said evaporation stages, requiring shut down and intensive cleaning actions. In what evaporation position of flow these precipitations occur, i.e. $1^{st}$-$2^{nd}$-$3^{rd}$-$4^{th}$-$5^{th}$-$6^{th}$ or $7^{th}$ evaporation effect in the evaporation train, depends upon the current concentration of different dry matter content, and that may shift from one mill to another depending upon chemical profiling of the processes used and type and origin of cellulosic material. In order to clean the heat transfer tubes, there is a need to wash the heat transfer tubes using rather tough cleaning methods such as high pressure cleaning equipment, steam cleaning or acid cleaning. Any modifications of the surfaces must be made in such a way that the heat transfer tubes may be washed while still allowing a functional cleaning of the tubes. In particular, the surface modifications must be made such that they will not be destroyed or damaged to any greater extent from the cleaning operation.

OBJECT OF THE INVENTION

A first object of the invention is to provide an improved heat transfer tube for falling film evaporation of spent liquor containing lignin and other dissolved components from cellulosic material and/or inorganics from the cellulosic material and chemicals used.

A second object of the invention is to provide a method for manufacturing such a heat transfer tube.

Definitions

For the purpose of this disclosure, the term surface weld is a weld that is applied on a surface in order to attach a wire and shape a wire bump on the smooth surface. A butt weld is a weld that is applied between two abutting plates and merges these plates into one common plate via said butt weld.

For the purpose of this disclosure, the term thin layer or falling film (of spent liquor) is a layer of spent liquor that preferably has a thickness of 1-10 mm, which flows over a heated surface and on the opposite side of the layer is exposed to a gaseous environment into which the solvent will evaporate. The spent liquor may, for example, be spent cooking liquor.

THE INVENTION

The first object of the invention is achieved with a heat transfer tube as initially described, wherein the falling film surface of the heat transfer tube is equipped with several wire bumps as seen in a direction along the longitudinal extension of the heat transfer tube. The wire bumps are formed by one or several wires and the wire bumps have a height, measured orthogonally to the falling film surface, in the range 0.3 to 5.0 mm, said wire bumps having a width, measured at the widest portion orthogonally to the longitudinal direction of the wire bumps, in the range 0.3 to 5.0 mm, and said wire bumps have an inclination angle versus a plane orthogonal to a longitudinal axis of the heat transfer tube in a range of 0-70 degrees. These wire bumps provide for a disturbance or turbulence in the thin film of spent cooking liquor that increases the heat transfer rate while introducing only a limited increase of stress in the material. This solution also ensures that the tubes are still accessible for steam or acid spraying lances for steam or acid cleaning. The wire bumps are in general welded to the falling film surface, preferably by using electronic resistance welding (EWR) which technique is suitable since it only induces small stresses to the material.

The wires used may be ordinary wires with a circular cross sectional area. It may also be a wire having a square shaped cross sectional area or any desired shape. In case that a circular shaped wire is used could the cross sectional area be modified to be more square shaped with edges or at least with a reshaped curvature in order to adapt its shape to give the bump a better profile for inducing turbulence. Hence, the bump may have different cross sectional shapes in order to function as a turbulence inducer.

The application area is of outmost importance for increasing energy efficiency in the evaporation train of a pulp mill, as about ⅓ of the total energy demand for a modern pulp mill is used in the evaporation plant. The total heating surface in the evaporation train in a modern but average pulp mill may exceed 50.000 $m^2$. If an existing evaporation train in a pulp mill needs to meet a higher capacity, when total volumes of spent cooking liquor to be evaporated increases as total production of pulp increases, this increased evaporation capacity may be met by surface modifications of the heat transfer surfaces in an already existing structure. If installed in a new evaporation plant the total installed heating surface may be decreased, enabling major cost reductions.

The heat transfer tubes may be made from a great variety of sheet metal material. The heat transfer tubes may be manufactured from any material suitable for the purpose. In the present case, any normal corrosion resistant pressure vessel materials could be used e.g. iron based steel material, different grades of stainless steels and similar materials normally utilized in evaporation of these types of water solutions and suspensions. Suitable for forming the heat exchanger tubes may for example be an iron based high alloy stainless steel material with an alloy content above 16.00% for Chromium and above 1% for Nickel, preferably corresponding to corrosion resistant steel qualities like AISI 316 or AISI 304 or better or Duplex. Said steel qualities withstand the high alkali concentration in combination with high sulfidity concentration that may cause Stress Corrosion Cracking (SSC). AISI 316 has an alloy composition of Cr:16.00-18.00%, Ni:10.00-12.00%; Mo 2.00-2.50%; AISI 304 has an alloy composition of Cr:17.50-18.50%, Ni 8.00-10.00%; Lean Duplex/ASTM S32101 has an alloy composition of Cr:21.00-24.00%, Ni:1.00-5.50%; Mo0.10-0.60%; and Lean Duplex/ASTM S32304 has an alloy composition of Cr:21.00-25.00%, Ni:3.00-6.00%; Mo:0.1-0.6%. In these applications should excessive plastic deformation be kept at a minimum and such modifications are not suitable in general to be made on the tubes as these leave high stress forces in the material that may be difficult to release by heat treatment as the tubes most often are longer than available heating ovens.

The above described dimensions of the wire bumps (height and width) preferably apply to tube evaporators where the diameter of the tube is in the range 20-100 mm, even more preferably 40-60 mm, allowing application of said wire material forming the wire bumps on finally shaped tubes but more preferably on flat steel plates that later are shaped and welded to tubes e.g. by butt welding via an axially running weld or butt welding via a spirally running weld. In particular when the wires forming the wire bumps are located on the inside of the tube evaporators is it useful to weld the wires onto flat steel plates.

The energy efficiency may be increased by up to 100% with these dimensions and orientations of the wire bumps, while still meeting the requirement of cleaning possibility if precipitation occurs on the heat transfer surfaces during evaporation of the passing thin layer of spent cooking liquor.

In a preferred embodiment of the invention the distance along the longitudinal axis of the heat transfer tube between adjacent wire bumps, i.e. between an upper edge of a lower wire bump and a lower edge of an upper wire bump, is in the range 3-250 mm, preferably 3-50 mm, and even more preferably 5-20 mm. In general, the turbulence induced by the wire bumps will have an effect to the falling film for a distance of about 10 mm from where the turbulence is induced until the turbulent flow will be essentially laminar again. The specific distance is dependent of a lot of parameters such as the shape and height of the wire bumps, viscosity of the liquid film as well as the velocity in the flow why different distances between the wire bumps may be desired depending on these conditions. In their closest arrangement, the wire bumps will guarantee a thorough formation of turbulence in the thin film that never settles to a laminar flow. In their most distant arrangement, each wire bump limits the length of the laminar flow that forms below a preceding wire bump.

In a preferred embodiment of the invention the height of said wire bumps is in the range 0.5-2.0 mm. Keeping the height within this range keeps costs down for additional wire material.

The height of the wire bumps may be higher in tubes fed with spent cooking liquor with higher dry matter content. For example, in a first evaporation effect where the spent liquor fed to the effect is 20% the height of the wire bump may be about 0.5 mm as this may be sufficient to cause turbulence in the relative low viscosity conditions, while a later evaporation effect fed with spent liquor with dry matter content at 50% may have a height of the wire bumps about 2.0 mm as this may be required to cause turbulence at higher viscosity conditions.

In a preferred embodiment of the invention, the width of said wire bumps is in the range 0.3-5 mm, preferably 0.4-4 mm and even more preferably 0.5-2 mm. Keeping the width within this range has the advantage of inducing turbulence in the liquid film by disturbing the film flow.

In an embodiment of the invention, several wire bumps are inclined in relation to a plane orthogonal to the longitudinal axis of the heat transfer tube and extends helically along at least a portion of the length of the heat transfer tube. The wire bumps are inclined with an angle below or equal to 70 degrees and preferably below or equal to 50 degrees. In some embodiments, the inclination angle is within the range 1-15 degrees, and in other embodiments within the range 15-45 degrees. In one alternative embodiment may at least two wire bumps be inclined and extend in parallel, which makes it possible to increase the angle of each wire bump, i.e. to change the pitch, while also increasing the distance, measured in the longitudinal direction of the tube between adjacent wire bumps.

In a further embodiment a wire bump may extend within a plane orthogonal to the longitudinal axis of the heat transfer tube. Advantageously, the wire bump forms a circular bump on the falling film surface of the heat transfer tube. At least five parallel wire bumps may be applied to the falling film surface of the heat transfer tube. Advantageously, the distance between each ring shaped wire bump, e.g. between an upper edge of a lower wire bump and a lower edge of an upper wire bump, is within the range 3-250 mm, preferably 3-50 mm and even more preferably within the range 5-20 mm. The upper limit of the number of such wire bumps applied is restricted by the total length of the tube and the distance between the wire bumps. In an embodiment of the invention is at least half the length of the heat exchanger tube provided with wire bumps, and more preferably essentially the whole heat exchanger tube, provided with wire bumps at a distance from each other, i.e. between an upper edge of a lower wire bump and a lower edge of an upper wire bump, in the range of 3-50 mm and more preferably in the range of 5-20 mm.

In a preferred embodiment, wire bumps are applied to the heating medium surface of the heat transfer tube, which heating medium surface is exposed to and heated by the heating medium. Such wire bumps will increase the total area exposed to the heating medium, and thus the energy transferred from the heat medium.

A wire bump may be formed by a long wire attached to the heat transfer surface so as to form a helix and thus form a number of wire bumps adjacent to each other along the heat transfer surface in the longitudinal direction. Alternatively, or in combination with a longer wire forming some of the wire bumps, could the wire bumps be formed by shorter pieces of wires, e.g. pieces corresponding to one complete circle, such that a plurality of wire bumps arranged in line at a distance from one another are formed by separate wires. In either case, the wire or wires are arranged to provide a multitude of wire bumps following each other along the longitudinal length of the heat transfer tube.

The heat transfer tube according to the invention is suitable for spent liquor with dry matter content above 0.5%, and even more suitable for spent liquor with dry matter content within a range 15-50%.

The heat transfer tube according to the invention is particularly suitable for vertical falling film evaporators.

The second object of the invention is achieved with a method as initially described, which method comprises the step of applying at least one wire bump to the falling film surface of the heat transfer tube, said wire bump having a height in the range 0.3-5 mm, a width in the range 0.3-5 mm, and an inclination angle versus a plane orthogonal to a longitudinal axis of the heat transfer tube in a range of 0-70 degrees.

A wire for creating a wire bump may be applied on a surface of an assembled heat transfer tube by means of a surface weld, e.g. by heat resistance welding, as a service modification of heat transfer tubes in existing evaporation stages. If the thin film of spent liquor is flowing on the outside of the tube, like in FIGS. 1a and 1b, could a swiveling welding head mounted around the tube be used to attach the wire. The swiveling welding head may then be driven axially along the tube while rotating such that the surface weld is applied and the wire attached. If the thin film of spent liquor is flowing on the inside of the tube, like in FIG. 2, a rotating welding head extending into the tube could be used together with a feeding mechanism for a wire.

In an alternative method for manufacturing the heat transfer tube may the wire be attached by a surface weld, e.g. by the use of resistance welding, on at least one surface of the heat transfer tube while forming a planar steel strip into a tube. By integrating the application of the wire during the tube forming operation total work hours for manufacturing tubes with wire bumps could be kept at the same order as for unmodified tubes. Hence, this method of operation has considerable advantages in reducing time and cost for applying the wire bumps to the heat transfer tubes.

In yet a similar alternative method for manufacturing the heat transfer tube may the wire be applied by surface welding on at least one side of a planar steel strip before form shaping the strip to a tubular form and welding the edges of the steel strip together with a butt fusion weld. The application of the wire by a surface weld on the planar steel strip would enable usage of standard welding machines, e.g. an electronic resistance welding machine. It is also possible to apply the wire on at least one surface of a steel strip while form shaping the planar steel strip to a tubular form by spiral shaping the planar steel strip and welding the edges of the steel strip together with a butt fusion weld. This is preferably done by controlling the feed of the wire forming the bumps and welding it onto the surface, e.g. by electrical resistance welding, simultaneously as the welding head for butt welding passes over the edges to be fusioned and shaping the heat exchange tube.

DRAWINGS

The figures show preferred embodiments of the invention, wherein

FIG. 3a shows a first embodiment of the inventive surface modification of the heat transfer tube with an overall continuous helical wire shape and constant pitch forming the wire bumps, with an enlarged part shown in FIG. 3b, and FIG. 3c showing a cross section of the wire or wires applied;

Figure 5A:
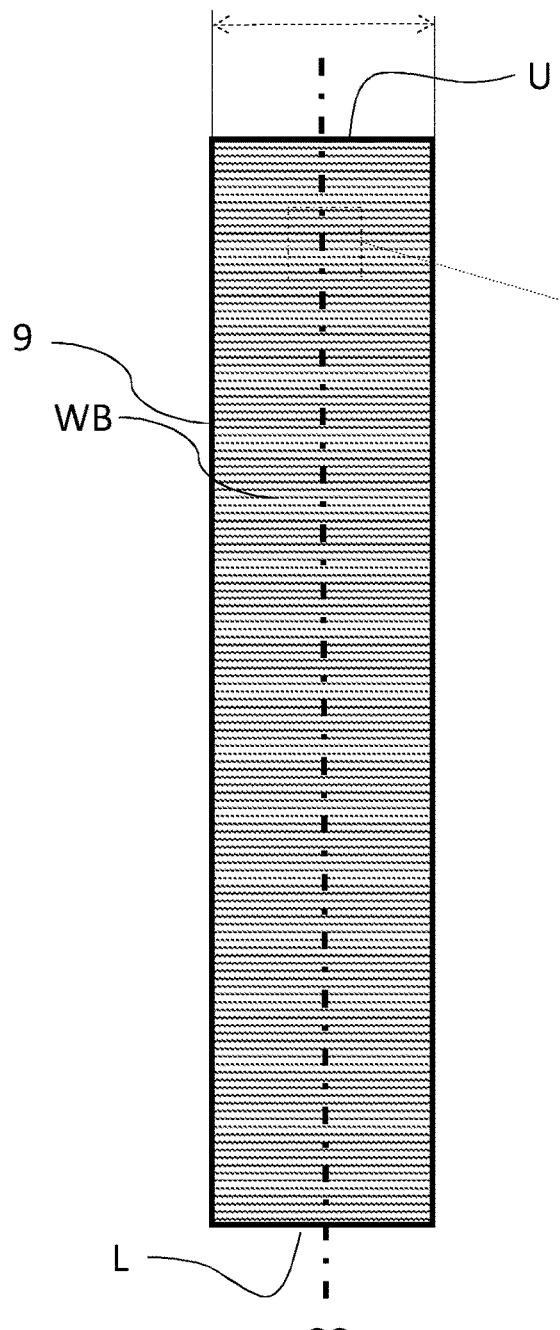
Figure 5B:
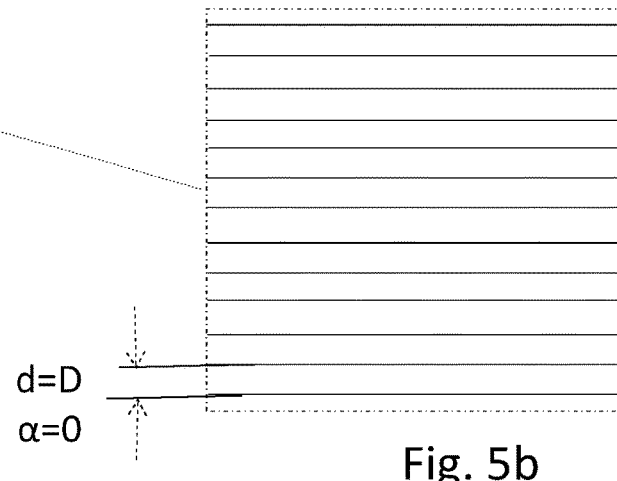
Figure 5C:
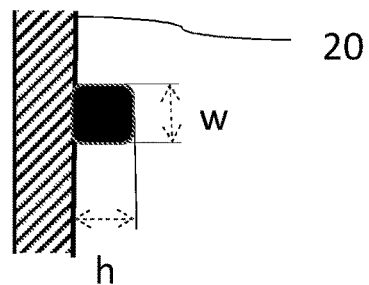

FIG. 4a shows a second embodiment of the inventive surface modification of the heat transfer tube with multiple inclined wires, with an enlarged part shown in FIG. 4b and FIG. 4c showing a cross section of the wire or wires applied; and FIG. 5a shows a third embodiment of the inventive surface modification of the heat transfer tube with a multitude of circular wires, all arranged orthogonal to the longitudinal axis of the tube, with an enlarge portion shown in FIG. 5b and FIG. 5c showing a cross section of the wire or wires applied; and FIG. 6 discloses a method for producing such heat transfer tube as disclosed in FIGS. 1-5.

DETAILED DESCRIPTION

Throughout this description, a heating medium surface is a surface arranged to be heated by a heating medium, whereas a falling film surface is a surface arranged to have spent liquor passing over it as a falling film.

Figure 1A:
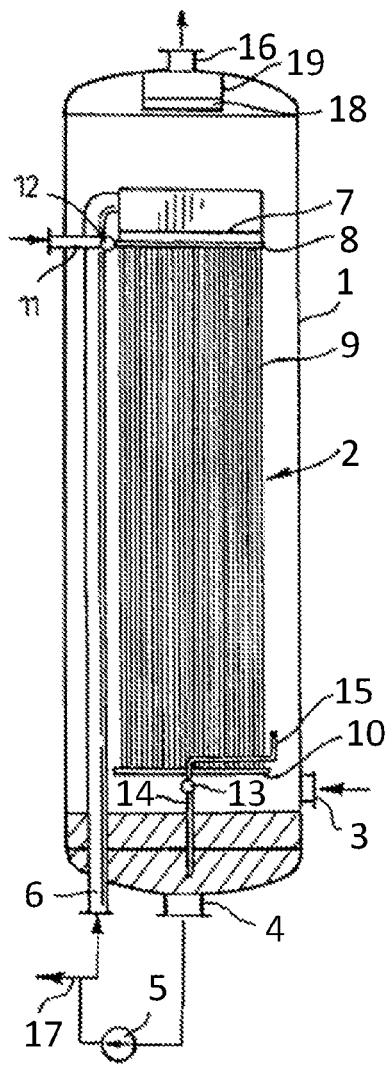
FIGS. 1a and 1b shows in orthogonal cross section views a tube evaporator where spent liquor flows as a thin film on the outer surface of the heat transfer tubes.
Figure 1B:
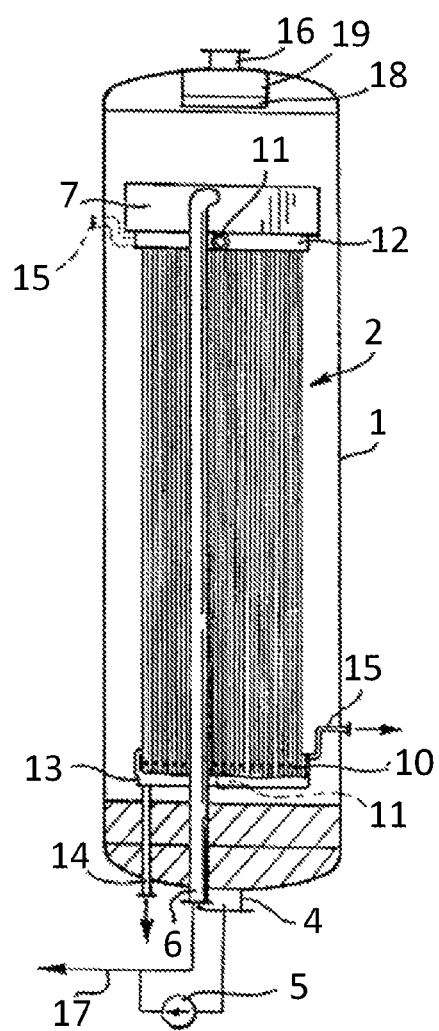

FIGS. 1a and 1b illustrate schematically a tube evaporator for evaporating spent liquor. The evaporator comprises a shell 1 containing a set 2 with multiple heat transfer tubes 9 arranged vertically in the shell 1.

FIG. 1 is seen in a cross sectional view through the shell 1, with the heat transfer tubes 9 exposed. FIG. 1b is also seen in a cross sectional view through the shell 1, but seen from the left-hand side of FIG. 1a. A liquid to be concentrated, in this case spent liquor, is fed through an inlet connection 3 into the shell 1, to the bottom thereof forming a volume of liquid with the surface level below the tubes 9. Liquor is discharged from the bottom of the evaporator through an outlet connection 4 and part of it is pumped by means of a schematically shown pump 5 through a circulating tube 6 into a distributing basin 7 above the set 2, from which basin it flows substantially evenly on steam distribution chambers 8 of the evaporating elements and from there further along outer falling film surfaces of separate heat transfer tubes 9 downwards. At the lower end of the heat transfer tubes 9, the concentrated spent liquor flows along the outer surface of steam collecting chambers 10 and falls subsequently into the liquor in the lower part of the shell 1 and mixes therewith.

To provide evaporation, vapour is led through the heat transfer tubes 9, and it is at first fed in through an inlet channel 11 in the upper part of the set 2 to steam distribution chambers 8 connected to upper parts of the heat transfer tubes 9. From there the vapour enters firstly a connecting chamber 12, which is connected to the upper collecting chambers 8 of the evaporating elements, so that the vapour is distributed through these evenly to all heat transfer tubes 9. Correspondingly, the remaining part of the vapour and condensate are collected, after having passed downwards along inner heating medium surfaces of the heat transfer tubes 9, in the steam collecting chambers 10 of the lower end of the evaporating elements, these collecting chambers being connected to a lower connecting chamber 13. From the lower part of the lower connecting chamber 13 starts an outlet channel 14 for condensate, through which channel the condensate is discharged, and respectively, from the upper part of the connecting chamber 13 starts an outlet channel 15 for vapour, through which channel the remaining heating vapour is exhausted. The water evaporated from the spent liquor under the influence of heating is exhausted as vapour through an outlet connection 16 at the upper end of the shell 1, and respectively, the concentrated liquor is bled off from the recirculation through a pipe 17. Inside the evaporator, in front of the outlet connection 16, there is further a mist separator 18 in such a way that water or liquor drops possibly contained in the exhaust vapour is caught on the mist separator and led back downwards. The mist separator is mounted to be enclosed by a closed housing 19 on each side so that all exhaust vapour must flow through the mist separator 18.

Figure 2:
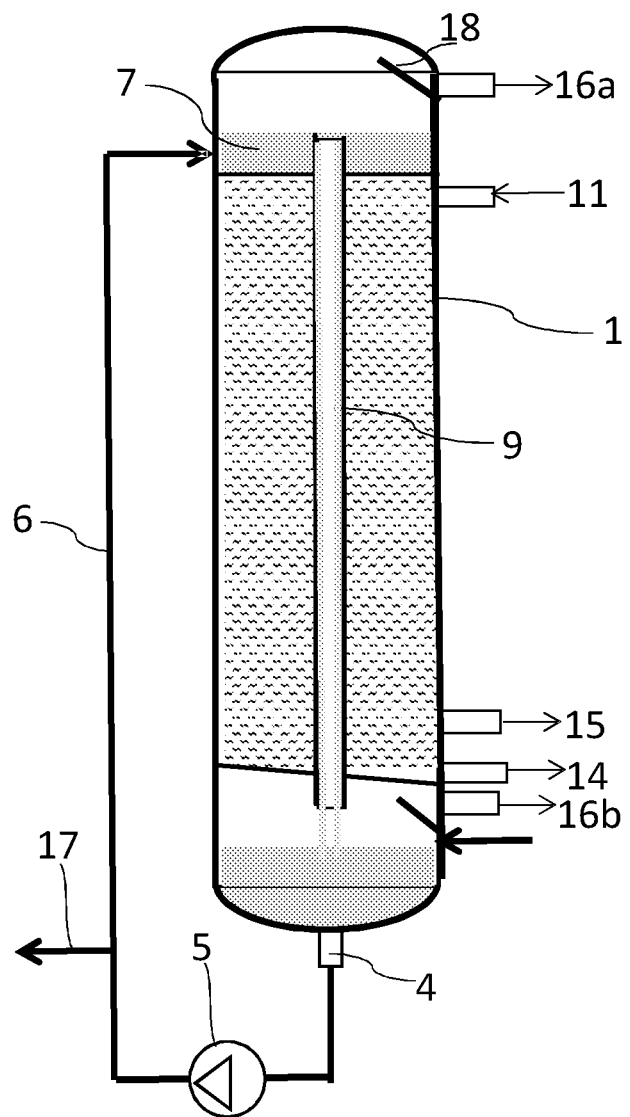
FIG. 2 shows schematically an alternative tube evaporator wherein spent liquor flows as a thin film on the inner surface of the heat transfer tubes.

FIG. 2 illustrate schematically an alternative tube evaporator for evaporating spent liquor, with the difference that the spent liquor is flowing as a thin film on an inner falling film surface of the heat transfer tube. Details with same function as those shown in FIGS. 1 and 2 are given the same reference number. FIG. 2 is seen in a cross sectional view through the shell 1, with only one of the heat transfer tubes 9 exposed. In a real evaporator are several tubes arranged in parallel, with a distance of about 1-4 centimeter between neighboring heat transfer tubes 9, and with a tube diameter in the range 2-10 centimeter. A spent liquor to be concentrated is fed through the shell 1, to the bottom thereof forming a volume of spent liquor with the surface level below the heat transfer tubes 9. Spent liquor is discharged from the bottom of the evaporator through an outlet connection 4 and part of it is pumped by means of a schematically shown pump 5 through a circulating tube 6 into a distributing basin 7. From the upper surface level of the basin is spent liquor flowing over the upper edge of the tube and onto the inner falling film surface of the heat transfer tube 9 as a thin film and further downwards. At the lower end of the heat transfer tube 9, the concentrated spent liquor falls into the volume of liquid. While flowing as a thin film over the inner falling film surface of the heat transfer tube 9 is the tube heated by a heating medium at the outer heating medium surface of the heat transfer tube 9, and the film is thus exposed to evaporation during passage. Heating media is supplied via inlet channel 11, and in the lower end is residual steam extracted via outlet channel 15 and clean steam condensate is drained off via outlet channel 14. The dirty steam evaporated from the spent liquor may be bled off via upper outlet connection 16a and lower outlet connection 16b, and preferably are condensate deflectors/mists separator 18 used. The concentrated liquor is bled off from the recirculation through a pipe 17. It should be noted that the heating media may also be steam evaporated from other evaporation stages, and in such cases would the condensate collected in outlet channel 14 not be classified as clean water, instead dirty condensate containing turpentine or other liquids that has a condensation temperature close to that established in the heating media chamber.

The invention may be used on both types of tube evaporators, i.e. where the spent liquor flows as a thin film on an outer falling film surface of the heat transfer tube, as shown in FIGS. 1a and 1b, and where the spent liquor flows as a thin film on an inner falling film surface of the heat transfer tube, as shown in FIG. 2.

FIG. 3a shows schematically a view of a heat transfer tube 9. FIG. 3b shows an enlarged portion of FIG. 3a, and FIG. 3c shows a cross sectional view of the wire bump WB.

In the figures is:
CC the longitudinal axis of the heat transfer tube 9;
d the distance between adjacent wire bump WB;

α the inclination angle of the wire bump WB versus a plane orthogonal to the center axis CC of the heat transfer tube 9, in this embodiment close to 15 degrees;

The distance D between adjacent stamped bumps along the longitudinal axis of the heat transfer tube is d divided by cos α; a corresponds to the angle between the centre axis CC and an axis orthogonal to the extension direction of the wire bumps h the height of said wire bump WB, measured orthogonally to the falling film surface 20, preferably in the range 0.4 to 4.0 mm; and w the width of said wire bump WB, measured over the widest portion and orthogonally to the longitudinal direction of the wire bump WB, preferably in the range 2-15 mm.

The same denotations will also apply in FIGS. 4 and 5.

In FIG. 3a is shown a wire forming a multitude of wire bumps WB is applied on an outer falling film surface 20 of the heat transfer tube 9. The helical pattern will thus form a multitude of wire bumps WB crossing an imaginary line running along the envelope surface of the heat transfer tube 9 from one end to another parallel to the longitudinal axis CC. As disclosed in FIG. 3a, the continuous and helically shaped wire running on the envelope surface of the heat transfer tube should correspond to 30 wire bumps SB distributed along the envelope surface which intersects or passes an imaginary line on the envelope surface running from the upper end U to the lower end L of the heat transfer tube 9 parallel to the longitudinal axis CC.

It should be noted that the same configuration could be achieved also if there are a multitude of wire portions added, e.g. could there be a multitude of wire portions having a length corresponding to a full turn for a certain inclination angle such that an end of a first wire portion will be in line with an end of a next wire portion such that the overall structure will remind of a single wire forming a helix. Hence, the wire portions should have length corresponding to the circumference of the tube divided by cos α in order to have wire portions adapted to fit in with each other and having the prescribed inclination angle α.

FIG. 3b shows an enlarged portion of FIG. 3a where it is disclosed a pair of parallel neighbouring wire bumps BP and the distance d between the wire bumps is the distance along a line orthogonal to the extension direction of the wire bumps. The distance D, which is the distance between a pair of neighbouring wire bumps along the longitudinal axis CC which in general is coinciding with the vertical direction when the heat transfer tube 9 is in use, may be calculate as d divided by α, D=d/cos α.

In FIG. 3c is disclosed a cross sectional view of an essentially circular wire bump WB attached to the outer envelope surface which in this case is the falling film surface 20. The bump is disclosed to deviate somewhat from a circular shaped wire by being somewhat compressed and flattened as a consequence of a slight deformation from the welding operation.

It should be understood that the wire may be applied instead on the inner surface of a heat transfer tube, even though a bit more complicated, if the thin film of spent cooking liquor flows on said inner surface.

FIG. 4 shows a second embodiment of the heat transfer tube 9 according to the invention.

FIG. 4a shows schematically the heat transfer tube 9 with multiple wire portions applied by welding to form parallel wire bumps WB stretching continuously along the outer envelope surface.

FIG. 4b shows an enlarged part of the heat transfer tube, wherein:

d is the distance between adjacent wire bumps WB,

α is the inclination angle of the wire bumps WB versus a plane orthogonal to the center axis CC of the heat transfer tube 9, in this embodiment about 45 degrees.

D is the distance between adjacent stamped bumps in a direction parallel to the longitudinal axis CC and is calculated as d divided by cos α

In FIG. 4c is disclosed a cross sectional view of an oval wire bump WB attached to the outer envelope surface which in this case is the falling film surface 20. The bump is disclosed to deviate somewhat from an oval shaped wire by being somewhat flattened at its contact point with the falling film surface as a consequence of a slight deformation from the welding operation. The oval shape may be achieved from compressing a wire, having a circular cross section, against the falling film surface 20 when being attached to the surface.

FIG. 5 shows a third embodiment of the heat transfer tube 9. In FIG. 5a is shown a multitude of circular wires attached by surface welds such that they are forming wire bumps WB applied to the outer falling film surface 20 of the heat transfer tube. All wire bumps WB are arranged orthogonal to the longitudinal axis CC of the heat transfer tube 9. Each wire bump is thus a circular ring, with a multitude of rings applied along the outer envelope surface of the heat transfer tube.

FIG. 5b shows an enlarged part of the heat transfer tube 9. In this case will the distance D, which is the distance between two adjacent wire bumps along the longitudinal axis CC of the heat transfer tube 9, be equal to the distance d, which is the distance between the wire bumps WB orthogonal to the their longitudinal extension, since when α=0 will cos α be cos 0=1 why the distance D=d/cos α=d/1=d.

In FIG. 5c is disclosed a cross sectional view of an essentially square shaped wire bump WB attached to the outer envelope surface which in this case is the falling film surface 20. The wire bump has somewhat rounded corners to reduce fouling. The oval shape may be achieved from compressing the wire against the falling film surface 20 to which it is attached. The height of the wire bump is preferably in the range 0.3 to 5.0 mm and the width w preferably in the range 0.3 to 5.0 mm as for the other shapes of wires disclosed in FIGS. 4 and 5.

In FIGS. 3-5 have different cross sectional surfaces of the wire bumps WB been disclosed. It is obvious that any of these shapes would apply to the arrangement in any of the embodiments described in FIGS. 3-5, and further different shapes may be used.

The wires forming the wire bumps WB to be arranged on the falling film surface 20 of the heat transfer tube 9 may be attached onto the heat transfer tube after the heat transfer tube 9 is shaped or to a planar steel strip before or simultaneous to when form shaping the strip to a tubular form. The wire portions used to form the wire bumps WB may be arranged in a net by means of thin fixation wires, fixing the distance between wire portions at equidistant distance between neighboring wire portions, before attaching the net on the surface by welding, e.g. by electrical resistance welding. The fixation wires may be of any suitable material lasting at least sufficient time to keep the wire portions in right place when performing the welding.

Figures 6A, 6B, 6C:
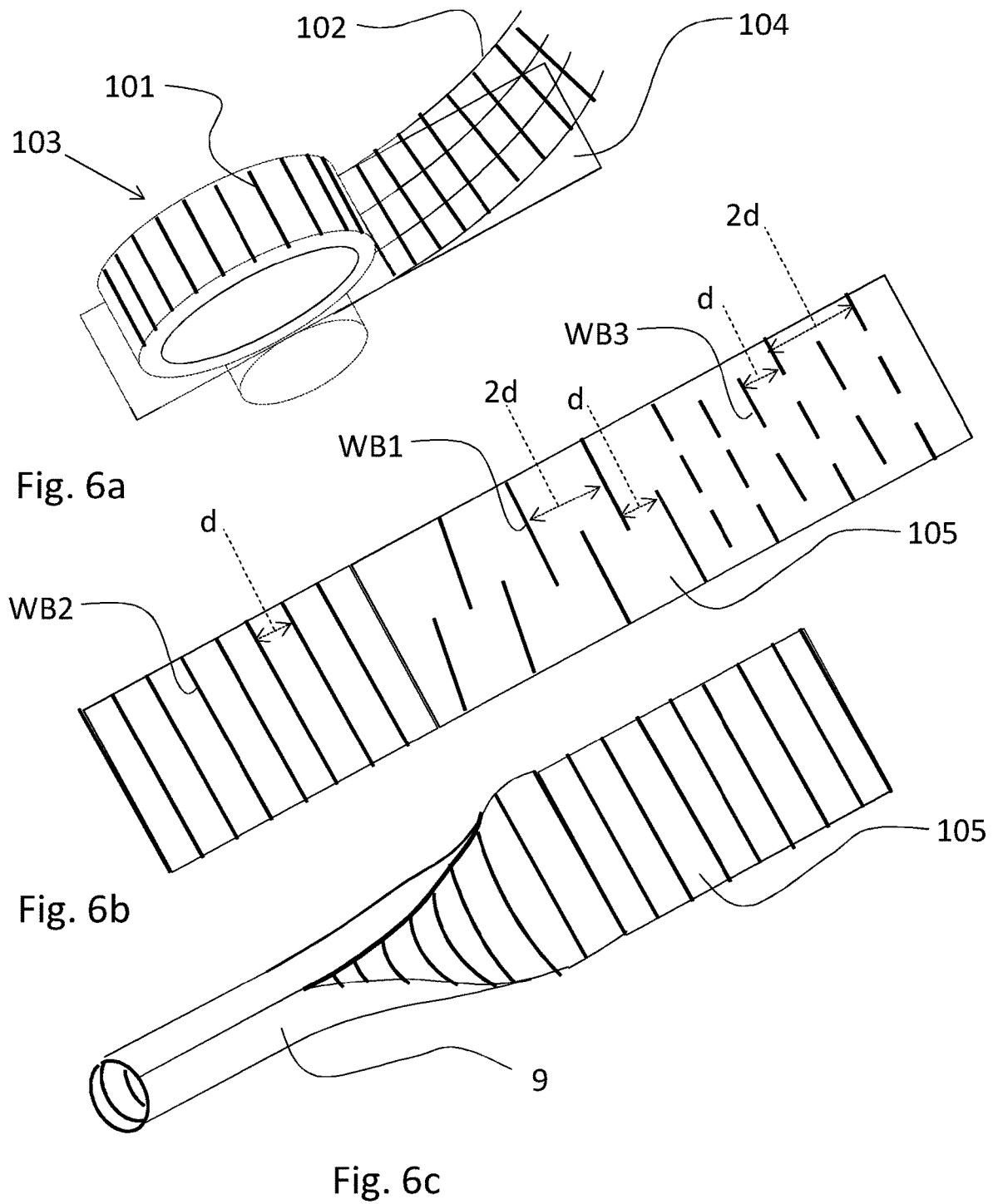

In FIG. 6 is disclosed a method for production of the heat transfer tube 9. In a first step, disclosed in FIG. 6a, is disclosed how wire portions 101 are arranged in a wire fixation net 102 which has been rolled up onto a wire net roll 103. The wire fixation net 102 is unrolled from the wire net roll 103 and is laid out onto a sheet metal plate 104. The sheet metal plate 104 could also come from a roll of rolled up sheet metal plate.

Depending on the manufacturing equipment available, there are several different ways of performing the application of the wire portions 101 to the sheet metal plate 104. For example, the wire portions 101 could be readily attached, e.g. by Electrical Resistance Welding (ERW), to the sheet metal plate 104 at the same time as the wire net roll 103 is rolled out and placed onto the sheet metal plate 104 so as to form a wire bump metal plate 105 comprising wire bumps WB as disclosed in FIG. 6b. The bumps may be designed differently depending on the intended use of the heat transfer tube 9 to be made.

In FIG. 6b there are exemplified 3 different configurations of wire bumps; WB1 which are wire bumps made to stretch essentially half the width of the sheet metal plate 104 and every second wire bump stretching from a first side of the sheet metal plate and every other second wire bump stretching from the other second side of the sheet metal plate 104. The wire bumps are separated on each side about 2d from each other and in an overlapping region in the middle of the wire bump metal plate 105 is the distance between the closest wire bumps WB1 half the distance, i.e. distance d. There are also some wire bumps of half the length disclosing an arrangement with inclined wire bumps WB1. In a second pattern of the wire bumps, WB2, they stretch all over the width of the wire bump metal plate 105 and are separated by a distance d from each other. In still a further embodiment is there disclosed third kind of wire bumps, WB3, which are made from shorter wires having two or three pieces in line and having four rows of wire bumps, the wire bumps in each row separated by a distance of 2d and the lines separated from each other by a distance d. Hence, the wire portions 101 may be designed to have different lengths and configurations relative one another and different configurations of the wire bumps WB in the heat transfer tube 9 may be achieved depending on the pattern of the wire portions 101 in the wire net roll 103. In general, the wire bump metal plate only comprises one of these patterns disclosed in FIG. 6b and the different layout on the same wire bump metal plate in FIG. 6b is mainly for showing different possible patterns.

When the wire bump metal plate 105 has been manufactured with the attached wire portions 101 as disclosed in FIG. 6b, could it be rolled up and transported as a roll to a desired location. Alternatively, the wire bump metal plate 105 could be further transported to be worked on without being rolled up again. The wire bump metal plate 105 could for example be transported directly to another welding station where the wire bump metal plate 105 is bent and rolled to be tubular shaped, e.g. as disclosed in FIG. 6c, before being welded at the edges by butt welding in order to form heat transfer tubes 9.

In an alternative embodiment (not shown), no wire fixation net 102 is used but the wire portions 101 are directly located on the sheet metal plate 104, e.g. by having a long wire which is placed at the right location on the sheet metal plate 104 whereby a wire portion 101 is welded to the plate and cut off from the long wire when being welded to form a wire bump WB on the sheet metal plate 104.

It shall further be noted that the wire portions in the net may have other configurations, e.g. arranged to be laid onto the sheet metal plate 104 such that the wire bumps will be inclined as disclosed in FIGS. 3 and 4. Hence, as previously described, the helical shaped pattern described in FIG. 3 may be made from a multitude of discrete wire portions.

The above described methods may have process advantages since the attachment of the bumps may be made to a flat surface and form part of the forming process of the heat transfer tube when the sheet metal is worked on. Hence, this implies an efficient process without the need to work on the cylindrical heat transfer tubes after they have been formed which in particular may be a more complicated process when the bumps are desired to be located on the inside of the tube. However, it would be possible to attach the wires to provide bumps in existing tubes as well, e.g. if desired to provide already existing tubes with such bumps as disclosed herein in order to improve the performance in a working pulp process plant.

The scope of protection is not limited to the above described embodiments. The skilled person understands that the embodiments can be modified and combined in many different ways without parting from the scope of the invention. For example, the wire bumps, in the figures may be discontinuous and they may be arranged on any of the inner and outer surfaces of the heat transfer tubes.

The invention claimed is:

1. A heat transfer tube for falling film evaporation of spent liquor, the heat transfer tube comprising:
   a heating medium surface configured to be heated by a heating medium; and
   a falling film surface opposite and facing away from said heating medium surface, which falling film surface is configured to have spent liquor containing lignin and other dissolved components from cellulosic material and/or inorganics from the cellulosic material and chemicals used passing over it as a falling film while evaporating solvent from the falling film and thus increasing the dry matter content; said heat transfer tube being made from a sheet metal material, wherein
   the falling film surface of the heat transfer tube is equipped with a multitude of wire bumps, each wire bump being spaced apart along the longitudinal axis of the heat transfer tube from a neighbouring wire bump by 3-300 mm; said wire bumps having a height in the range 0.3-5.0 mm; said wire bumps having a width in the range 0.3-5.0 mm; and said wire bumps having an inclination angle versus a plane orthogonal to a longitudinal axis of the heat transfer tube in a range of 0-70 degrees.

2. A heat transfer tube according to claim 1 wherein said wire bumps are formed by a multitude of wire portions located on the falling film surface, each wire portion having an extension on the falling film surface such that its projection onto a plane orthogonal to the longitudinal axis corresponds to at least a portion of a circle.

3. A heat transfer tube according to claim 1 wherein said wire bumps are welded onto the falling film surface by means of electric resistance welding.

4. A heat transfer tube according to claim 1, wherein a distance along the longitudinal axis between adjacent wire bumps is in the range 3-50 mm.

5. A heat transfer tube according to claim 4 wherein a distance along the longitudinal axis between adjacent wire bumps is in the range 5-20 mm.

6. A heat transfer tube according to claim 1, wherein the height of said wire bumps is in the range 0.5 to 2.0 mm.

7. A heat transfer tube according to claim 6 wherein the height of said wire bumps is in the range 0.7-1.7 mm.

8. A heat transfer tube according to claim 1, wherein at least one wire bump is inclined in relation to said orthogonal plane.

9. A heat transfer tube according to claim 1, wherein at least one wire bump extends within a plane orthogonal to the longitudinal axis of the heat transfer tube.

10. A heat transfer tube according to claim 1, wherein at least one wire bump is applied on the heating medium surface of the heat transfer tube.

11. A heat transfer tube according to claim 1 wherein the sheet metal material comprises an iron based high alloy stainless steel material with an alloy content above 16.00% for Chromium and above 1% for Nickel.

12. A heat transfer tube according to claim 1 wherein the sheet metal material comprises AISI 316 or AISI 304 steel.

13. Method for manufacturing a heat transfer tube for falling film evaporation of spent liquor, which method comprises the step of assembling the heat transfer tube comprising:
   a heating medium surface arranged to be heated by a heating medium;
   a falling film surface opposite and facing away from said heating medium surface, which falling film surface is arranged to have spent liquor containing lignin and other dissolved components from cellulosic material and/or inorganics from the cellulosic material and chemicals used passing over it as a falling film while evaporating solvent from the falling film and thus increasing the dry matter content, said heat transfer tube being made from an iron based high alloy stainless steel material with an alloy content above 16.00% for Chromium and above 1% for Nickel, wherein the method comprises the step of applying a multitude of wire bumps to the falling film surface of the heat transfer tube and each wire bump being spaced apart along the longitudinal axis of the heat transfer tube from a neighbouring wire bump by 3 to 300 mm, said wire bumps having a height in the range 0.3 to 5.0 mm, said wire bumps having a width in the range 0.3 to 5.0 mm, and said wire bumps having an inclination angle versus a plane orthogonal to a longitudinal axis of the heat transfer tube in a range of 0-70 degrees.

14. Method for manufacturing a heat transfer tube according to claim 13, which method comprises the step of applying the wire bumps on the falling film surface of the heat transfer tube while forming a planar steel strip into said heat transfer tube.

15. Method for manufacturing a heat transfer tube according to claim 14 which method comprises the step of applying the wires used to form the wire bumps by the use of a rolled up net provided with the wire portions and said net adapted to be rolled out and laid down on sheet metal material used to shape the heat transfer tube.

16. Method for manufacturing a heat transfer tube according to claim 13, which method comprises the step of applying the wire bumps on the falling film surface of a planar steel strip before form shaping the strip to a tubular form and welding the edges of the steel strip together with a butt fusion weld.

17. Method for manufacturing a heat transfer tube according to claim 13, which method comprises the step of applying the wire bumps on the falling film surface of an assembled heat transfer tube.

18. Method for manufacturing a heat transfer tube according to claim 13, which method comprises attaching wires to an envelope surface of the heat transfer tube by electric resistance welding.

19. Method for manufacturing a heat transfer tube according to claim 13, said heat transfer tube being made from AISI 316 or AISI 304 steel.

\* \* \* \* \*